(12) United States Patent
Rotter et al.

(10) Patent No.: US 9,403,334 B1
(45) Date of Patent: *Aug. 2, 2016

(54) METHODS AND TOOLS FOR FORMING COMPOSITE STRUCTURES WITH NON-PLANAR PATTERNS OF CONTOURS

(71) Applicant: The Boeing Company, Seal Beach, CA (US)

(72) Inventors: Daniel M. Rotter, Lake Forest Park, WA (US); Brad Andrew Coxon, Everett, WA (US); Arvid J. Berg, Seattle, WA (US); Richard V. Phillips, Enumclaw, WA (US); Stephen Lee Metschan, Black Diamond, WA (US); Kurtis Shuldberg Willden, Kent, WA (US); Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/189,853

(22) Filed: Feb. 25, 2014

Related U.S. Application Data

(60) Provisional application No. 61/905,653, filed on Nov. 18, 2013.

(51) Int. Cl.
*B29C 70/00* (2006.01)
*B29D 99/00* (2010.01)

(52) U.S. Cl.
CPC .................................. *B29D 99/0014* (2013.01)

(58) Field of Classification Search
None
See application file for complete search history.

(56) References Cited

U.S. PATENT DOCUMENTS

| | | | |
|---|---|---|---|
| 7,228,611 B2 | 6/2007 | Anderson et al. | |
| 7,527,222 B2 | 5/2009 | Biornstad et al. | |
| 8,157,212 B2 | 4/2012 | Biornstad et al. | |
| 8,168,023 B2 | 5/2012 | Anderson et al. | |
| 8,182,628 B2 | 5/2012 | Biornstad et al. | |
| 8,906,179 B2 * | 12/2014 | Coxon | B29C 70/32 156/189 |
| 9,023,265 B1 * | 5/2015 | Rotter | B29C 53/24 264/258 |
| 2010/0011580 A1 | 1/2010 | Brennan et al. | |
| 2010/0012260 A1 | 1/2010 | Brennan et al. | |

OTHER PUBLICATIONS

U.S. Appl. No. 13/626,452, filed Sep. 25, 2012, Robins et al.
U.S. Appl. No. 13/668,210, filed Nov. 2, 2012, Kline.
U.S. Appl. No. 13/693,887, filed Dec. 4, 2012, Rotter et al.
U.S. Appl. No. 13/732,961, filed Jan. 2, 2013, Rotter et al.
U.S. Appl. No. 13/886,976, filed May 3, 2013, Metschan et al.

\* cited by examiner

*Primary Examiner* — Monica Huson
(74) *Attorney, Agent, or Firm* — Dascenzo Intellectual Property Law, P.C.

(57) ABSTRACT

Methods and tools for forming composite structures with predetermined, non-planar patterns of contours, as well as apparatuses including such composite structures, are disclosed herein. Example methods include defining a pattern of contours in a flexible sheet of composite material, conforming the flexible sheet of composite material to a layup mandrel, and curing the flexible sheet of composite material. Example tools include a body with an engagement surface for engaging a flexible sheet of composite material, the body having regions of relative stiffness and regions of relative compliance, and a vacuum distribution manifold configured to selectively apply a vacuum to the regions of relative compliance to deform the engagement surface to define a predetermined, non-planar pattern of contours.

24 Claims, 8 Drawing Sheets

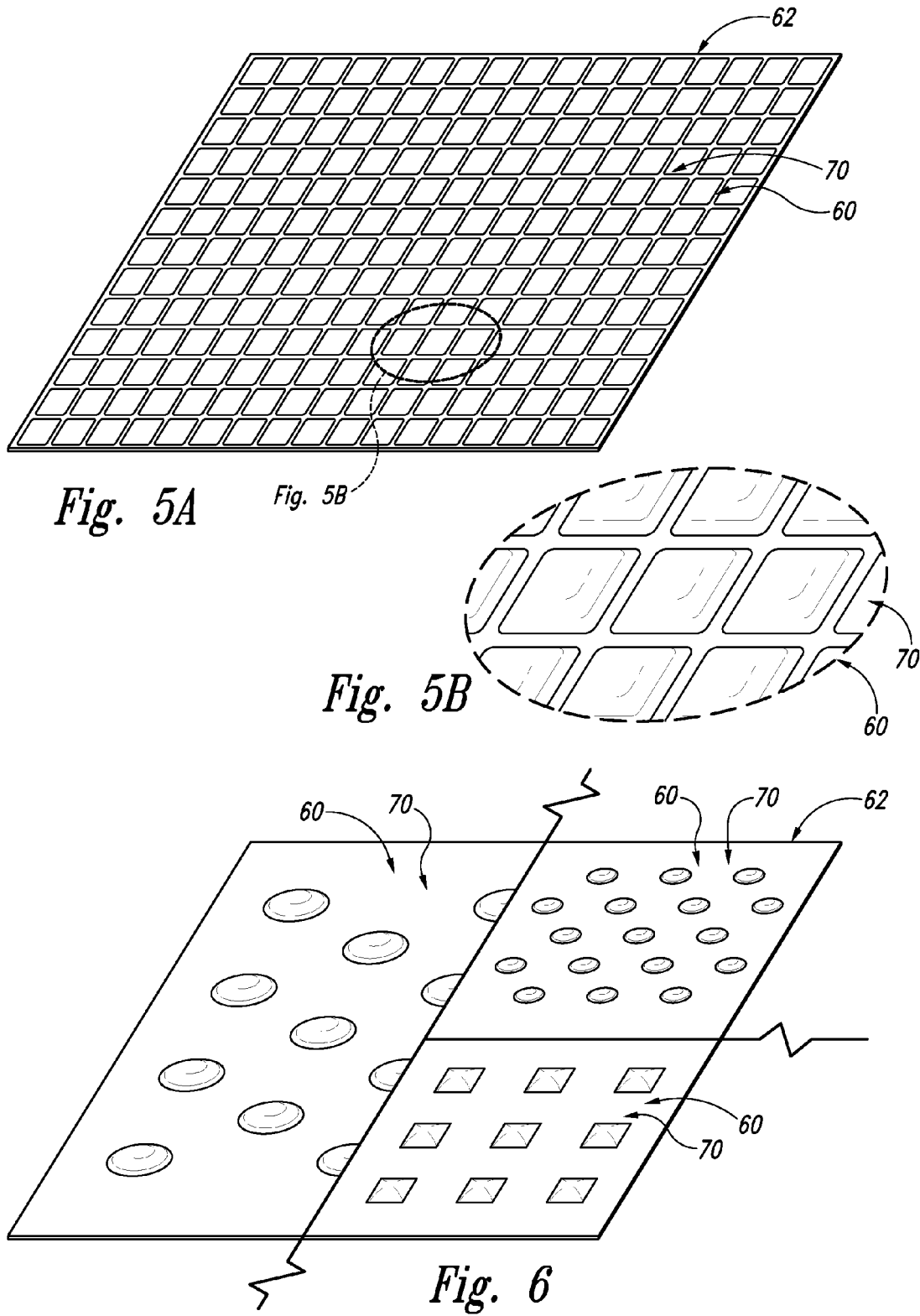

METHODS AND TOOLS FOR FORMING COMPOSITE STRUCTURES WITH NON-PLANAR PATTERNS OF CONTOURS

RELATED APPLICATION

This application claims priority under 35 U.S.C. §119(e) to U.S. Provisional Patent Application No. 61/905,653, which is entitled "METHODS AND TOOLS FOR FORMING COMPOSITE STRUCTURES WITH NON-PLANAR PATTERNS OF CONTOURS," which was filed on Nov. 18, 2013, and the disclosure of which is hereby incorporated by reference.

FIELD

The present disclosure relates to methods and tools for forming composite structures.

BACKGROUND

Composite structures, such as those that are constructed of fiber reinforced composite materials, typically are formed by conforming pre-cured or partially cured flexible sheets of composite material to a rigid mold, and then curing the composite material. Due to the nature of conforming a generally planar sheet of material to a mold having contours, including complex contours, it often is difficult to avoid imparting undesirable wrinkles to the composite material. The removal of undesirable wrinkles is difficult and time-consuming, and heretofore has been accomplished by hand-working the composite material in an effort to move, and eventually remove, the wrinkles. Moreover, the skills needed for such hand-working are generally undefined and self-taught through numerous hours of trial and error. Such wrinkling or other anomalies created during forming may not be acceptable to meet the performance requirements of the final composite structure.

SUMMARY

Methods and tools for forming composite structures with predetermined, non-planar patterns of contours, as well as apparatuses including such composite structures, are disclosed herein. Example methods include defining a predetermined, non-planar pattern of contours in a flexible sheet of composite material, conforming the flexible sheet of composite material to a layup mandrel, and curing the flexible sheet of composite material to form at least a portion of a composite structure. Example tools include a body with an engagement surface for engaging a flexible sheet of composite material, the body having regions of relative stiffness and regions of relative compliance, and a vacuum distribution manifold configured to selectively apply a vacuum to the regions of relative compliance to deform the engagement surface from a first configuration to a second configuration that defines a predetermined, non-planar pattern of contours with the engagement surface.

BRIEF DESCRIPTION OF THE DRAWINGS

FIG. 5A is a perspective view of another illustrative, non-exclusive example of a flexible sheet of composite material having defined therein a predetermined, non-planar pattern of contours.

FIG. 5B is a detail view of the flexible sheet of composite material of FIG. 5A, showing the predetermined, non-planar pattern of contours.

FIG. 6 is a perspective view representing additional illustrative, non-exclusive examples of a flexible sheet of composite material having defined therein a predetermined, non-planar pattern of contours.

DESCRIPTION

Figure 1:
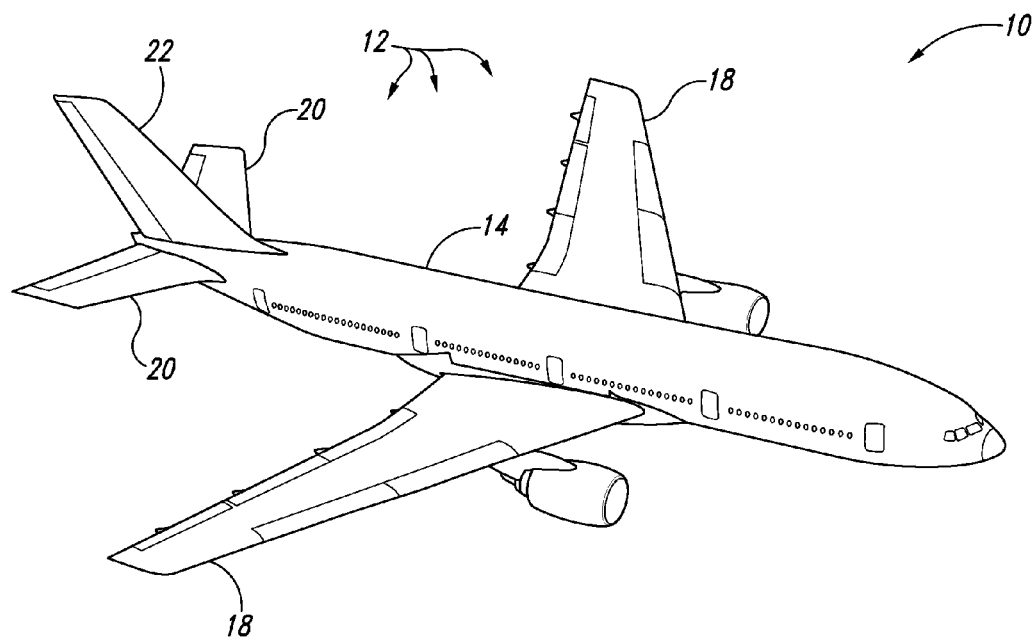
FIG. 1 is a perspective view of an illustrative, non-exclusive example of an aircraft.

Methods and tools for forming contoured composite structures, as well as apparatuses constructed of composite structures, are disclosed herein. In general, in the drawings, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

In FIG. 1, an example aircraft 10, which may include various composite structures 12, is provided; however, apparatuses other than aircraft are within the scope of the present disclosure and may include composite structures. For example, as illustrative, non-exclusive examples, other apparatuses that may include composite structures include (but are not limited to) spacecraft, watercraft, land vehicles, wind turbines, structural towers and masts, etc. Moreover, aircraft 10 may take any suitable form, including commercial aircraft, military aircraft, private aircraft, or any other suitable aircraft. While FIG. 1 illustrates aircraft 10 in the form of a fixed wing commercial aircraft, other types and configurations of aircraft are within the scope of aircraft 10 according to the present disclosure, including (but not limited to) helicopters.

As used herein, a composite structure refers to a structure that is constructed of composite materials, such as (but not limited to) fiber reinforced composite materials. Illustrative, non-exclusive examples of fiber reinforced composite materials include at least an epoxy or other polymer or binding material together with fibers, such as constructed of (but not limited to) glass fibers, carbon fibers, boron fibers, para-aramid (e.g., Kevlar®) fibers, and/or other fibers. In some examples, composite structures may be constructed of multiple layers, or plies, of fiber reinforced composite material. In some such examples, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are flexible and tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies. Prior to being cured, composite materials may be somewhat flexible, or at least flexible relative to a cured state of the composite material. Accordingly, prior to being cured, the composite material, which may be in the form of a sheet, or charge, may be molded or otherwise formed into a desired contour. Some composite materials may require heating prior to or during the forming or molding process, with such heat making the composite material more malleable and easier to conform to a desired shape, yet with such heat being lower than the temperature required to cure, and stiffen, the composite material. The temperature of the composite laminate may influence the rate of forming or the amount of bending that is permissible to define a desired contour due to the viscous properties of the uncured resin. Upon being cured, composite materials become rigid and hold their shape, yet may have a desired resilience depending on a particular application for the composite structure.

With continued reference to FIG. 1, aircraft 10 typically may be described as including a fuselage 14, which generally corresponds to the main body of an aircraft for holding passengers, crew, cargo, and/or equipment, for example, depending on the particular configuration and/or function of an aircraft. Typically, although not required, the fuselage of an aircraft is elongate and somewhat cylindrical or tubular. Aircraft 10 also may include wings 18, horizontal stabilizers 20, and a vertical stabilizer 22. One or more of a fuselage, wings, horizontal stabilizers, and vertical stabilizers, or portions thereof, may be constructed of composite materials. In some examples, such structures may be described as stiffened composite structures, such as being defined by a skin supported by a structural frame, or stiffeners. Any one or more of the aforementioned various structures of an aircraft, as well as other structures of an aircraft, may be described as contoured composite structures. By contoured, it is meant that such structures define non-planar surfaces. Some examples of contoured composite structures according to the present disclosure may have non-planar surfaces with a complex contour, meaning that within a given region of the surface, the intersection with any orientation of a plane is not linear.

Figure 2:
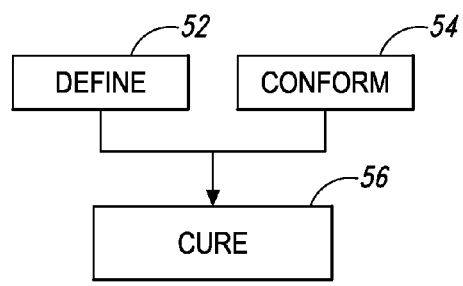
FIG. 2 is a flowchart representing illustrative, non-exclusive examples of methods of forming composite structures.
Figure 3A:
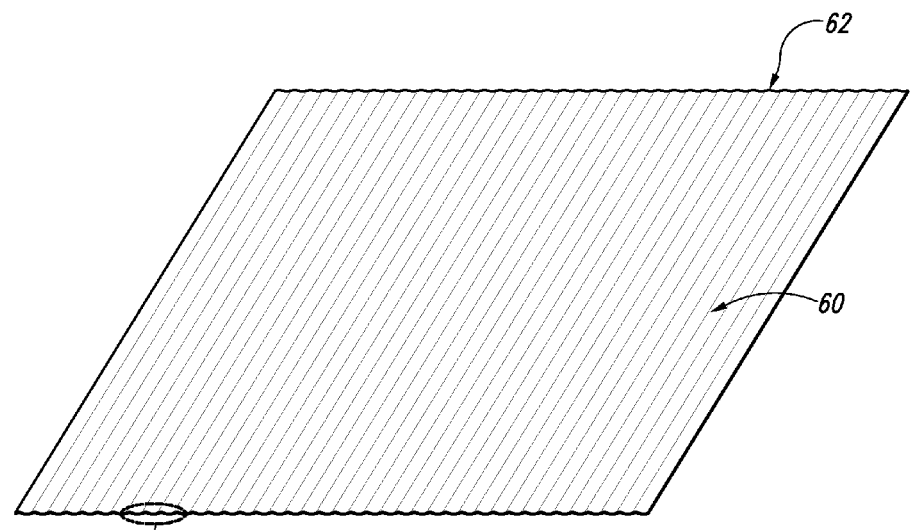
FIG. 3A is a perspective view of an illustrative, non-exclusive example of a flexible sheet of composite material having defined therein a predetermined, non-planar pattern of contours.
Figure 3B:
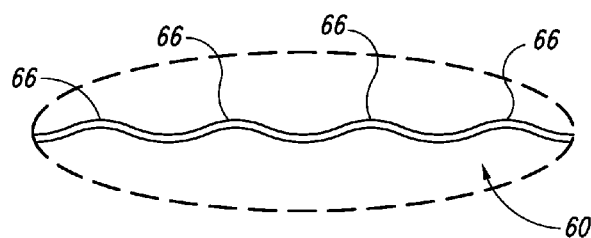
FIG. 3B is a detail view of the flexible sheet of composite material of FIG. 3A, showing the predetermined, non-planar pattern of contours.
Figure 4:
FIG. 4 is a schematic profile view representing illustrative, non-exclusive examples of a flexible sheet of composite material having defined therein a predetermined, non-planar pattern of contours.

FIG. 2 schematically provides a flowchart that represents illustrative, non-exclusive examples of methods 50 of forming composite structures, and FIGS. 9-16 schematically illustrate illustrative, non-exclusive examples of tools 100, and component parts thereof, for forming composite structures, with such tools optionally being configured to perform or facilitate one or more methods 50 according to the present disclosure. Methods 50 and tools 100 may be utilized to prevent, restrict, reduce, minimize, and/or shrink undesirable wrinkles in a composite structure during the forming process. Additionally or alternatively, methods 50 and tools 100 may be used to impart desired contours that meet the requisite quality standards for the composite structure being constructed, with such desired contours optionally being described as micro-wrinkles, micro-ridges, dimples, and/or wrinkles or ridges that are smaller in size than undesirable wrinkles. For example, depending on the desired ultimate surface contour of a composite structure, a flat charge of composite material may tend to wrinkle, or bunch up, when being molded into the desired contour. Methods 50 and tools 100 may be used to distribute the excess material that otherwise would create undesirable wrinkles, or bunched material, into micro-wrinkles, micro-ridges, and/or dimples that are of acceptable dimensions.

With reference initially to the flowchart of FIG. 2, but also with reference to the examples of FIGS. 3-8, a method 50 may include defining a predetermined, non-planar pattern of contours 60 in a flexible sheet of composite material 62, as indicated at 52, conforming the flexible sheet of composite material to a layup mandrel 64, as indicated at 54, and curing the flexible sheet of composite material to form at least a portion of a composite structure 12, as indicated at 56. As used herein, a predetermined, non-planar pattern of contours 60 refers to a pattern of contours that is selected for a particular purpose associated with the construction of a composite structure, such as to avoid undesirable wrinkles in the composite material when being conformed to a layup mandrel.

In some methods 50, the defining 52 is performed prior to the conforming 54. In some methods 50, the defining 52 is performed simultaneous with the conforming 54. In some methods 50, the defining 52 is performed following the conforming 54. In some methods 50, the conforming 54 initially results in one or more undesirable wrinkles in the flexible sheet of composite material, and the defining 52, when performed following the conforming 54, includes eliminating the one or more undesirable wrinkles. In some such methods 50, the eliminating includes distributing composite material from the one or more undesirable wrinkles amongst at least a portion of the predetermined, non-planar pattern of contours 60. Additionally or alternatively, in some methods 50, the defining 52 includes distributing composite material from the predetermined, non-planar pattern of contours 60 onto regions of the layup mandrel 64 that tend to create one or more undesirable wrinkles, such as if the defining 52 were not performed. Stated differently, the defining 52 may include distributing excess material that otherwise would create undesirable wrinkles, or bunched material, into micro-wrinkles, micro-ridges, and/or dimples that are of acceptable dimensions. As illustrative, non-exclusive examples only, undesirable wrinkles may be those that have a maximum dimension—such as a departure from a desired, or intended, location of the corresponding composite material—that is greater than 1 mm, 3 mm, 5 mm, or 10 mm.

In some methods 50, the defining 52 includes setting the flexible sheet of composite material 62 to at least temporarily retain the predetermined, non-planar pattern of contours 60 in the flexible sheet. For example, the defining may include at least partially curing and/or compacting the flexible sheet of composite material to set the desired pattern in the flexible sheet. FIGS. 3-6 provide illustrate, non-exclusive examples of predetermined, non-planar patterns of contours defined in a sheet of composite material. For example, in FIGS. 3A and 3B, the pattern of contours 60 is generally sinusoidal in profile with a plurality of parallel ridges 66. In some examples, the ridges may be evenly spaced apart, such as in the example of FIGS. 3A and 3B, whereas in other examples, the ridges may vary in spacing and frequency, such as in the examples of FIG. 4. Additionally or alternatively, in some examples, the ridges may be evenly deep, or define troughs that are evenly deep, such as in the example of FIGS. 3A and 3B, whereas in other examples, the ridges may vary in depth, such as in the examples of FIG. 4. Additionally or alternatively, in some examples, the ridges may increase and/or decrease in spacing and/or depth across a span of a sheet of composite material. In some such examples, the depth and/or spacing may increase and/or decrease generally linearly, or not generally linearly. Additionally or alternatively, the depth and/or spacing may increase and/or decrease generally asymptotically. Additionally or alternatively, the depth and/or spacing and/or size and shape may be somewhat random across a span of a sheet of composite material. Other configurations also are within the scope of the present disclosure, and patterns of contours 60 are not limited to the specific examples disclosed and illustrated herein.

As illustrative, non-exclusive examples, optional ridges 66 may have depths of 0.1-5 mm, 0.1-2 mm, 0.1-1 mm, 0.1-0.5 mm, 0.5-5 mm, 0.5-2 mm, 0.5-1 mm, 1-5 mm, 1-2 mm, 2-5 mm, about 0.1 mm, about 0.5 mm, about 1 mm, about 2 mm, and/or about 5 mm. Additionally or alternatively, ridges 66 may have a peak to peak spacing of 1-20 mm, 1-15 mm, 1-10 mm, 1-5 mm, 5-20 mm, 5-15 mm, 5-10 mm, 10-20 mm, 10-15 mm, 15-20 mm, about 1 mm, about 5 mm, about 10 mm, about 15 mm, and/or about 20 mm. Other examples of ridges and sinusoidal patterns also are within the scope of the present disclosure, including those with greater depth, less depth, greater spacing, and less spacing than the enumerated values herein.

Additionally or alternatively, the predetermined, non-planar pattern of contours 60 may include a plurality of spaced-apart, discrete, localized contours 70, with FIGS. 5-6 schematically illustrating such examples. By discrete and localized, it is meant that contours 70 are convex or concave relative to the adjacent surrounding regions of the flexible sheet of composite material. For example, while each ridge 66 of the example of FIGS. 3A and 3B generally spans the entirety of the illustrated sheet of composite material 62, in the examples of FIGS. 5-6, the localized contours 70 are discrete in nature relative to the whole of the sheet of composite material. Any suitable and desired contour may be utilized, including (but not limited to) contours having circular, rectangular, ovular, and diamond-shaped contours. FIGS. 5A and 5B schematically illustrate an example in which the localized contours may be described as rectangular or square. Moreover, in the example of FIGS. 5A and 5B, the localized contours are evenly spaced and collectively span the entirety of the sheet of composite material; however, such a configuration is not required. FIG. 6 schematically represents that a predetermined, non-planar pattern of contours 60 may include different shaped contours, contours that are evenly spaced with respect to each other, and contours than are unevenly spaced with respect to each other. Additionally or alternatively, the density of the spacing of dimples may vary and/or may be generally uniform. Localized contours 70 additionally or alternatively may be described as dimples.

As illustrative, non-exclusive examples, optional localized contours 70 may have depths of 0.1-5 mm, 0.1-2 mm, 0.1-1 mm, 0.1-0.5 mm, 0.5-5 mm, 0.5-2 mm, 0.5-1 mm, 1-5 mm, 1-2 mm, 2-5 mm, about 0.1 mm, about 0.5 mm, about 1 mm, about 2 mm, and/or about 5 mm. Additionally or alternatively, contours 70 may be spaced apart by 1-20 mm, 1-15 mm, 1-10 mm, 1-5 mm, 5-20 mm, 5-15 mm, 5-10 mm, 10-20 mm, 10-15 mm, 15-20 mm, about 1 mm, about 5 mm, about 10 mm, about 15 mm, about 20 mm, and/or greater than 20 mm. Other examples of localized contours also are within the scope of the present disclosure, including those with greater depth, less depth, greater spacing, and less spacing than the enumerated values herein.

Figure 7:
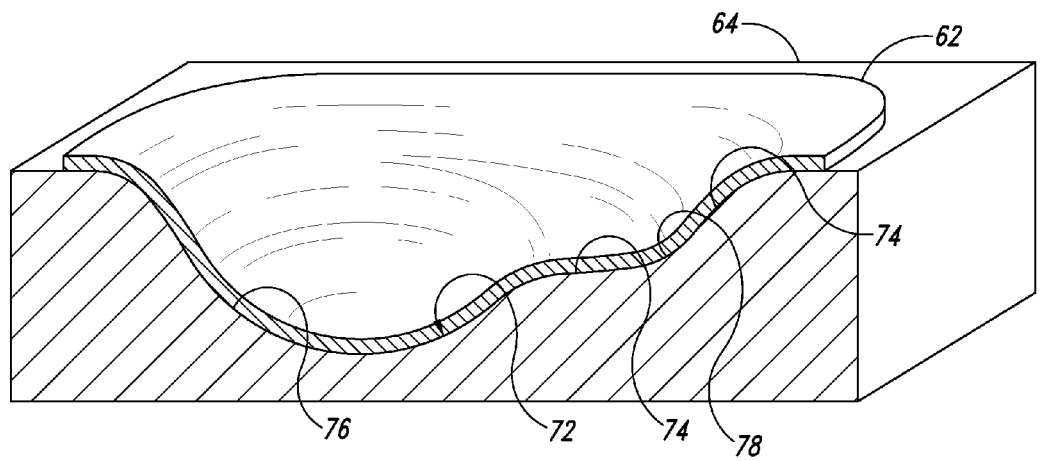
FIG. 7 is a cross-sectional perspective view of a layup mandrel that defines a complex contour, together with a flexible sheet of composite material conformed thereto.

FIG. 7 schematically illustrates an illustrative non-exclusive example of a layup mandrel 64. In the illustrated example, although not required, the layup mandrel defines a three-dimensional layup surface 72 that has a complex contour. In some methods 50, the predetermined, non-planar pattern of contours 60 may be selected to correspond with the three-dimensional layup surface of a layup mandrel. For example, in the illustrated example of FIG. 7, the three-dimensional layup surface includes regions 74 that are generally planar or flat, regions 76 that have relatively greater radii of curvature, and regions 78 that have relatively smaller radii of curvature. In such examples, the predetermined, non-planar pattern of contours 60 may be configured to minimize, reduce, or otherwise restrict or prevent undesirable wrinkles within these regions. For example, in regions 78 of relatively smaller radii of curvature, contours 60 may be more closely spaced and/or may have greater depths than in regions 76 of relatively greater radii of curvature, optionally with even greater spacing than within regions 74 that are generally planar or flat. Accordingly, in regions where undesirable wrinkles would tend to occur, the material of such undesirable wrinkles instead may be distributed amongst contours 60, with such contours meeting the requisite quality standards for the composite structure being constructed.

Figure 8:
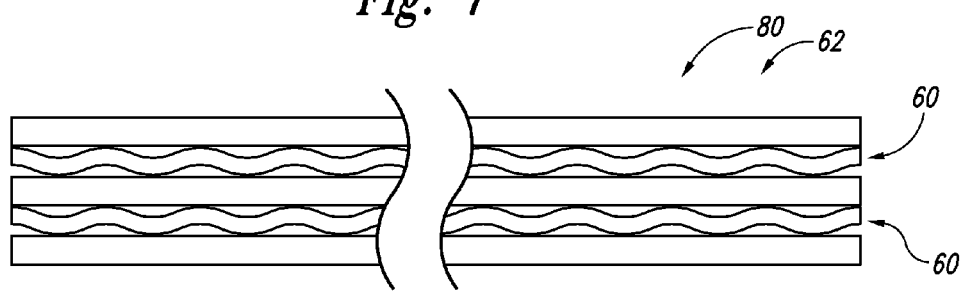
FIG. 8 is a schematic profile view representing illustrative, non-exclusive examples of composite material layups having a subset of plies having defined therein a predetermined, non-planar pattern of contours.

With reference now to FIG. 8, some methods 50 further include, prior to the conforming 54, stacking two or more plies or layers 80 of composite material, with the defining 52 having been performed on only a subset of the plies or layers. In the schematically illustrated example, layers of plies having a predetermined, non-planar pattern of contours 60 defined therein alternate with layers of plies not having a predetermined, non-planar pattern of contours, with such layers optionally including one or more individual plies of composite materials. However, other configurations of layering are within the scope of the present disclosure, and FIG. 8 is provided to schematically represent that any suitable and predetermined stacking may be performed to result in a desired characteristic of a stack of composite plies for conforming to a layup mandrel. As further illustrative, non-exclusive examples, the plies within a given layer and/or the layers within a stack may be arranged with the respective fibers oriented in a predetermined manner to result in desired characteristics of the stack as a whole. For example, the orientation of the fibers may affect the tendency for the stack as a whole to wrinkle and/or form desired contours.

As mentioned, the defining 52 of a method 50 may include compacting the flexible sheet of composite material 62. In some methods, the defining 52 may include vacuum compacting the flexible sheet of composite material. In some such methods 50, the vacuum compacting may be performed on the layup mandrel 64. Accordingly, in some such methods 50, the conforming also may include vacuum compacting the flexible sheet of composite material to the layup mandrel. In other words, in some methods, the defining 52 and the conforming 54 may be performed simultaneously by the same process.

Figure 9:
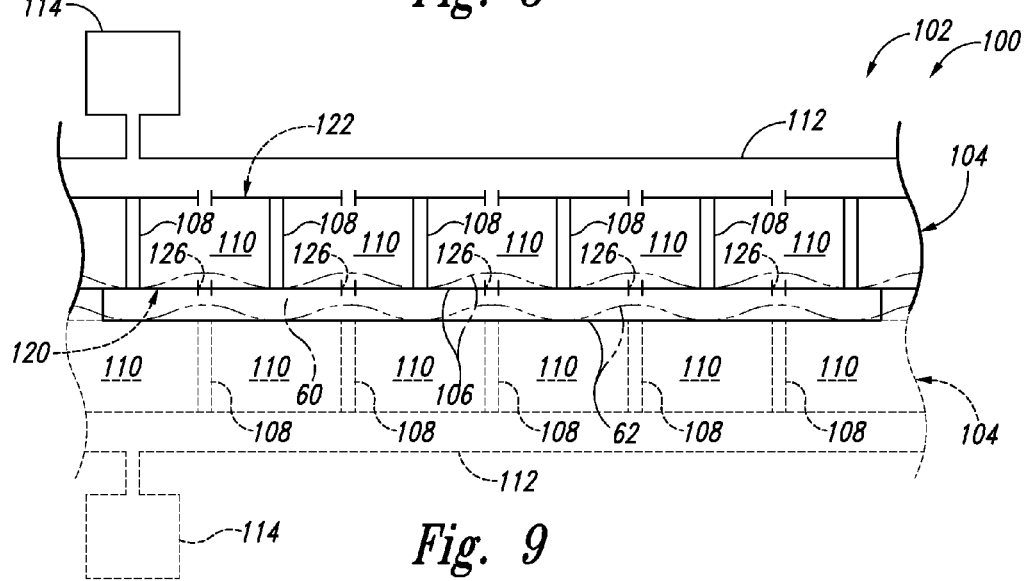
FIG. 9 is a schematic profile view representing illustrative, non-exclusive examples of tools used to impart a predetermined, non-planar pattern of contours to a flexible sheet of composite material.

Examples of tools 100 in the form of optional vacuum tools 102, and component parts thereof, are schematically illustrated in FIGS. 9-13. With reference initially to FIG. 9, a vacuum tool 102 may include a body, or barrier structure, 104 with an engagement surface 106 that is sized to at least partially span, and optionally fully span, a flexible sheet of composite material 62. The body includes regions 108 of relative stiffness and regions 110 of relative compliance, with the regions of relative stiffness and the regions of relative compliance collectively being configured to be deformed to have a contour that corresponds to a desired predetermined, non-planar pattern of contours in the flexible sheet of composite material.

Tool 102 also includes a vacuum distribution manifold 112 in fluid communication with the regions 110 of relative compliance and configured to selectively apply a vacuum from a vacuum source 114 to the regions of relative compliance. Under the vacuum, the engagement surface 106 is deformed from a first configuration, illustrated with a solid line in FIG. 9, to a second configuration, illustrated in a dash-dot line in FIG. 9. The second configuration defines the predetermined, non-planar pattern of contours 60 with the engagement surface, and therefore operatively deforms the flexible sheet of composite material to also include the predetermined, non-planar pattern of contours 60.

Figure 10:
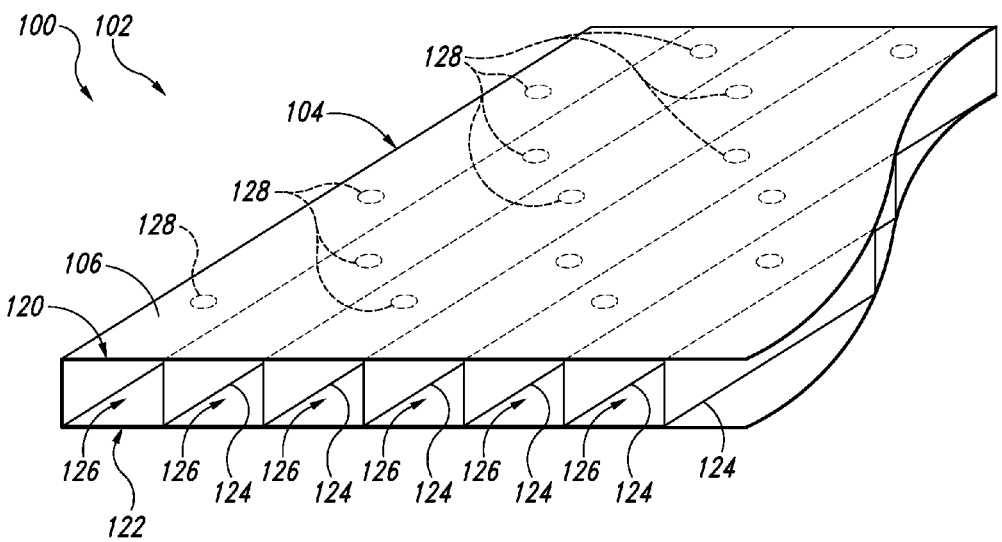
FIG. 10 is a fragmentary perspective view of a body of a tool used to impart a predetermined, non-planar pattern of contours to a flexible sheet of composite material.

As an illustrative, non-exclusive example and with reference to FIG. 10, the body 104 of a tool 102 may be defined by a first generally planar wall 120 that defines the engagement surface 106, a second, opposing generally planar wall 122, and a plurality of elongate webs 124 that extend between the first generally planar wall 120 and the second generally planar wall 122 to define a plurality of elongate channels 126. The elongate webs 124 define the regions 108 of relative stiffness, and the elongate channels 126 define the regions 110 of relative compliance of the tool. In some embodiments, a plurality of retention conduits 128 are defined in the first generally planar wall 120, through the engagement surface 106, so that when a vacuum is applied to the elongate channels via the vacuum distribution manifold, a flexible sheet of composite material 62 engaged with the engagement surface 106 will be retained against the engagement surface via suction. Moreover, when the vacuum is applied to the elongate channels, the first generally planar wall 120 will deform into the volume of the channels (that is, into the regions of relative compliance), thereby defining a generally sinusoidal pattern of contours to the engagement surface and to a flexible sheet of composite material engaged therewith.

When using a tool 102 in connection with a method 50, the method may include applying a vacuum to the regions 110 of relative compliance, deforming the body 104 to correspond to the predetermined, non-planar pattern of contours 60, retaining the flexible sheet of composite material 62 against the body, and at least partially compacting the flexible sheet of composite material to at least temporarily retain the predetermined, non-planar pattern of contours in the flexible sheet of composite material.

The body 104 of a tool 102 may include and/or be formed from any suitable material. As illustrative, non-exclusive examples, the body may include and/or be formed from a flexible material and/or a resilient material. As additional illustrative, non-exclusive examples, the body 104 may include and/or be formed from an optically transparent material, a semi-transparent material, and/or a translucent material, such as to permit visual inspection of a flexible sheet of composite material 62. As additional illustrative, non-exclusive examples, body 104 also may be formed from and/or include a polymeric material and/or a polycarbonate material.

Illustrative, non-exclusive examples of tools that may be suitable as tools 102 are disclosed in U.S. patent application Ser. No. 13/769,022, entitled "SYSTEMS AND METHODS FOR COMPACTING A CHARGE OF COMPOSITE MATERIAL" and filed on Feb. 15, 2013, the complete disclosure of which is incorporated herein by reference.

With reference to FIG. 9, some tools 102, although not required, may include a second body 104 for operative positioning against the flexible sheet of composite material 62 opposite a first body 104, with the regions 110 of relative compliance and the regions 108 of relative stiffness of the second body being staggered relative to the corresponding regions of the first body. Accordingly, when a vacuum is applied to the regions of relative compliance, the bodies cooperate to conform the sheet of flexible composite material to have the predetermined, non-planar pattern of contours.

Figure 11:
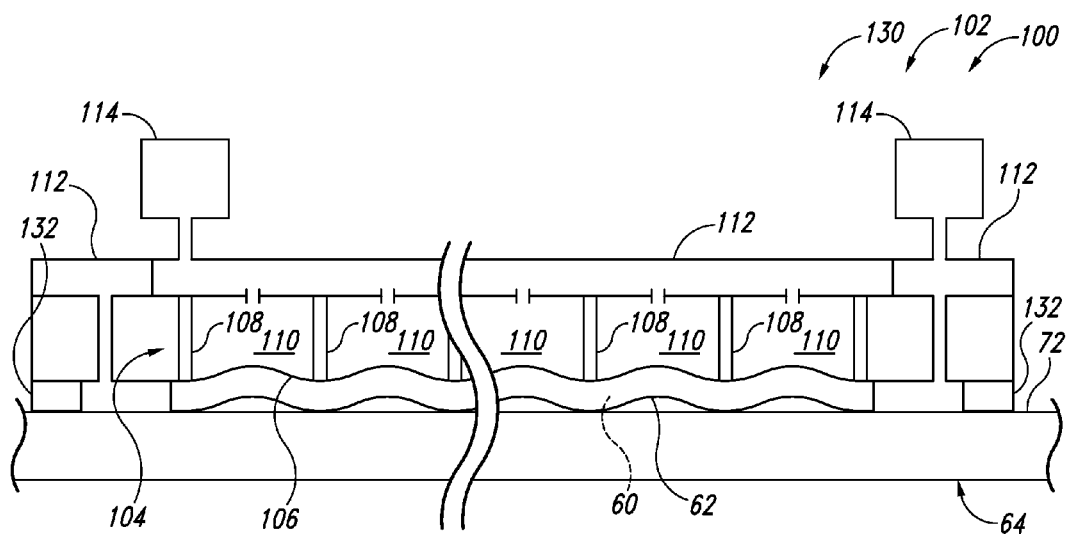
FIG. 11 is a schematic profile view representing illustrative, non-exclusive examples of tools used to impart a predetermined, non-planar pattern of contours to a flexible sheet of composite material while vacuum compacting the flexible sheet to a layup mandrel.

Some tools 102 may be described as vacuum chucks 102 or as vacuum transfer tools 102, for example, when they are used to transfer a flexible sheet of composite material 62 to a layup mandrel from a location that is remote from the layup mandrel, while at the same time conforming the flexible sheet of composite material to have the predetermined, non-planar pattern of contours 60. Additionally or alternatively, some tools 102 may be used to compact the flexible sheet of composite material to the layup mandrel, with such a tool optionally being described as a vacuum compaction tool 130 and being illustrated schematically in FIG. 11. A vacuum compaction tool 130 may include sealing structure 132 that is configured to form a fluid seal between the body 104 of the tool and the layup mandrel 64. In some embodiments, the sealing structure 132 may be integral with the body, while in other embodiments, the sealing structure may be operatively coupled to the body. In took 130, a vacuum distribution manifold 112 may be configured to apply a vacuum between the engagement surface 106 of the body 104 and the layup surface 72, when the vacuum compaction tool is operatively positioned over a flexible sheet of composite material 62, as schematically illustrated in FIG. 11. Accordingly, the vacuum compaction tool may operatively compact the flexible sheet of composite material to the layup surface. In some tools 130, the same manifold 112 and vacuum source 114 may be used in connection with both the vacuum compaction and the deforming of the regions 110 of relative compliance. Alternatively, in some tools 130, separate manifolds 112 and vacuum sources 114 may be utilized.

A method 50 that utilizes a tool 130 may include applying a vacuum between the body of the vacuum compaction tool and the layup mandrel to compact the flexible sheet of composite material on the layup mandrel.

As discussed, in some methods 50, the predetermined, non-planar pattern of contours 60 may be selected to correspond with the three-dimensional layup surface 72 of a layup mandrel 64.

Figure 12:
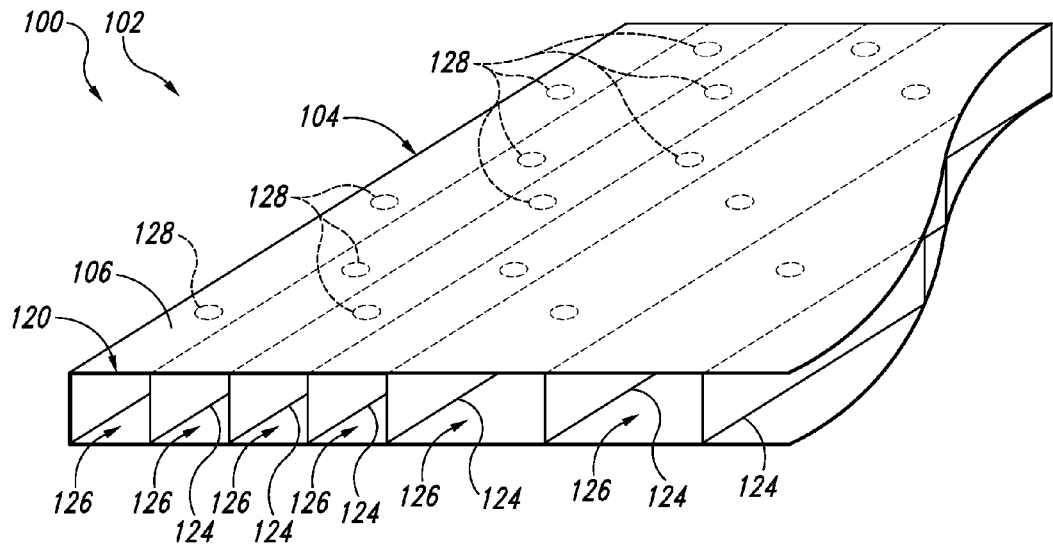
FIG. 12 is a fragmentary perspective view of a body of a tool used to impart a predetermined, non-planar pattern of contours to a flexible sheet of composite material.
Figure 13:
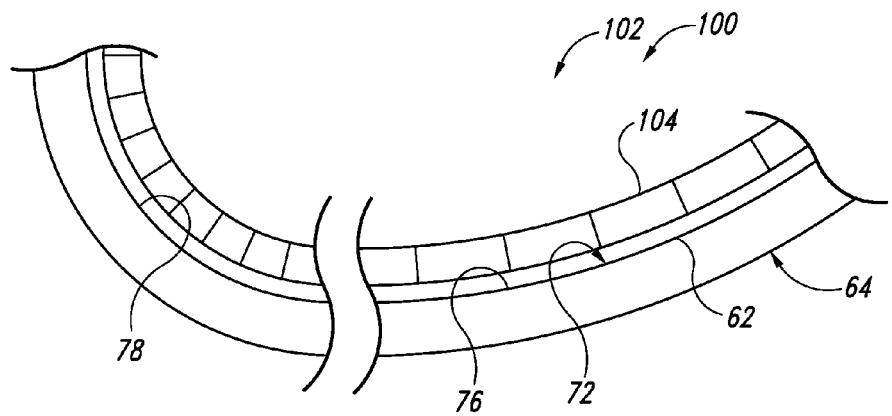
FIG. 13 is a schematic profile view representing an illustrative, non-exclusive example of a tool vacuum compacting a flexible sheet of composite material to a layup mandrel having a three-dimensional layup surface of varying radii of curvature.

Accordingly, with reference to the illustrative, non-exclusive example of FIGS. 12-13, the body 104 of a tool 102 may be configured to define the predetermined, non-planar pattern of contours to correspond with the three-dimensional layup surface. As illustrated in FIGS. 12-13, the width of the channels 126 may vary across the span of the body. Accordingly, the resulting sinusoidal pattern of ridges defined in a flexible sheet of composite material will be spaced closer together when the webs 124 are spaced closer together and will be spaced farther apart when the webs are spaced farther apart. As illustrated in FIG. 13, such a configuration of varying widths may be suitable for three-dimensional layup surfaces having varying radii of curvatures. As an example, it may be desirable to have the contours defined closer together adjacent to regions 78 of relatively smaller radii of curvature and to have the contours defined farther apart adjacent to regions 76 of greater radii of curvature. Such illustrative tools 102 may be described as custom tools 102, because they are specifically configured for a specific predetermined contour of a three-dimensional surface of a layup mandrel.

Figure 14:
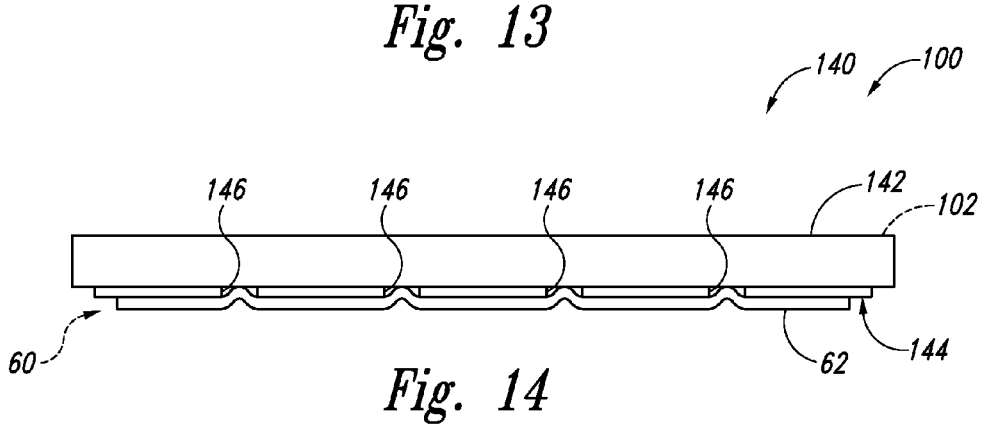
FIG. 14 is a schematic profile view representing illustrative, non-exclusive examples of tools used to impart a predetermined, non-planar pattern of contours to a flexible sheet of composite material.
Figure 15:
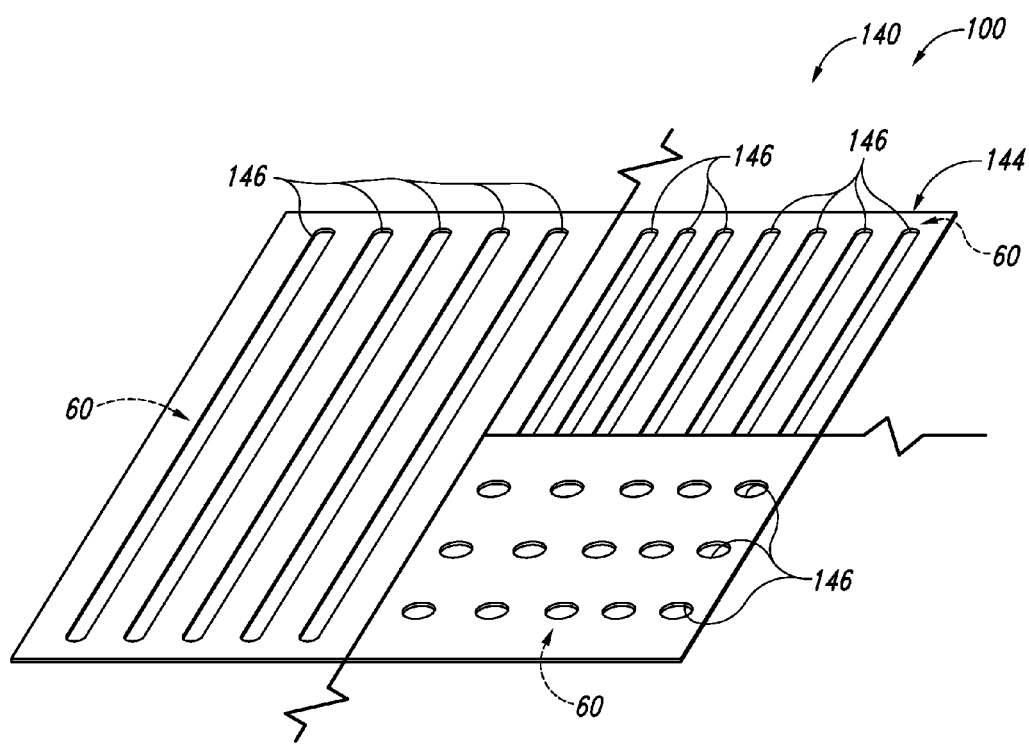
FIG. 15 is a schematic perspective view representing illustrative, non-exclusive examples of die sheets used in connection with the example tools of FIG. 14.

Turning now to FIGS. 14-15, additional illustrative, non-exclusive examples of tools 100, indicated and referred to herein as tools 140 are schematically presented. Tools 140 may be used in connection with some methods 50 to define a predetermined, non-planar pattern of contours on a flexible sheet of composite material 62. As schematically illustrated in FIG. 14, tools 140 include a transfer chuck 142, which also may be described as a transfer tool 142. A transfer chuck 142 is a tool that is configured to operatively engage and transfer a sheet of flexible composite material from one location to another. In some embodiments, the transfer chuck 142 may be, or include, a vacuum chuck 102.

Tools 140 also include a die sheet 144. The die sheet 144 includes a plurality of spaced-apart voids 146 that correspond to a predetermined, non-planar pattern of contours 60 to be defined in a flexible sheet of composite material 62. The voids may extend fully through the die sheet, or the voids may extend only partially through the die sheet, such as in the form of depressions.

A corresponding method 50 utilizing a tool 140 may include, prior to the defining 52, positioning the die sheet 144 between the flexible sheet of composite material 62 and the transfer chuck 142, with the defining 52 including deforming, with the transfer chuck, the flexible sheet of composite material at least partially into the plurality of spaced-apart voids 146. For example, in embodiments in which the transfer chuck is a vacuum chuck, the vacuum utilized to retain the flexible sheet of composite material to the vacuum chuck may serve to operatively deform the flexible sheet of composite material into the voids 146 of the die sheet. A tool 140 in combination with a layup mandrel may be described as a system for forming a composite structure.

Die sheet 144 and its corresponding voids 146 may take a variety of forms, depending on a particular application and desired predetermined pattern of contours 60 to be defined in a flexible sheet of composite material 62. As an illustrative, non-exclusive example, the die sheet may be constructed of a film material, such as a polyester material. FIG. 15 schematically illustrates that any desired pattern of voids 46 may be utilized, including a pattern of elongate slits, which may be evenly spaced and/or which may be unevenly spaced. Additionally or alternatively, the voids may include voids spanning at least a region of the die sheet in two dimensions, such as represented by the generally circular voids, although other shapes of voids may be used, as well. Accordingly, a die sheet 144 may be customized to result in a desired predetermined, non-planar pattern of contours 60 in a sheet of composite material.

In some examples, it may be desirable to have contours defined relatively closer together in some regions of the sheet of composite material, while it may be desirable to have contours defined relatively further apart in other regions of the sheet of composite material, depending on the curvature of the layup mandrel to which the sheet of composite material is to be conformed. In other words, the pattern of the plurality of spaced-apart voids 146 may be selected to correspond with a specific three-dimensional layup surface of a layup mandrel. Similar to the discussion of optional body 104 in FIGS. 12-13, the spacing of the voids 146 may be based on, or correspond to, the radii of curvature of a layup mandrel on which a sheet of composite material having the predetermined, non-planar pattern of contours is to be conformed. As an illustrative, non-exclusive example, a first subset of the spaced-apart voids may be spaced relatively closer together to correspond to a first region of relatively lesser radius of curvature of the layup surface, and a second subset of the spaced-apart voids may be spaced relatively further apart to correspond to a second region of relatively greater radius of curvature of the layup surface. Other examples also are within the scope of the present disclosure.

Figure 16:
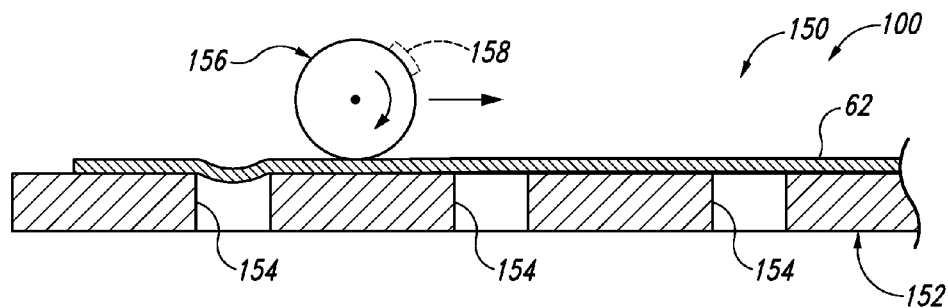
FIG. 16 is a schematic cross-sectional view representing illustrative, non-exclusive ways of imparting a predetermined, non-planar pattern of contours to a flexible sheet of composite material.

FIG. 16 schematically illustrates another alternative tool 100, indicated and referred to herein as a tool 150, that may be used in connection with some methods 50 to define a predetermined, non-planar pattern of contours on a flexible sheet of composite material 62. Specifically, a tool 150 may include a die 152 that defines voids 154 corresponding to a desired predetermined, non-planar pattern of contours, and a roller, or other press structure, 156 that is configured to deform the flexible sheet of composite material at least partially into the voids 154, as illustrated in FIG. 16. Accordingly, a corresponding method 50 may be described as including placing the flexible sheet of composite material on a die and deforming, and optionally rolling, the flexible sheet of composite material at least partially into the voids of the die. Tools 150 may be particularly useful for defining spaced-apart discrete, localized contours 70.

Additionally or alternatively, a tool 150 may include a roller 156 that includes one or more contour imparting structures 158 configured to impart a predetermined, non-planar pattern of contours on a flexible sheet of composite material 62 when the roller is rolled across the flexible sheet of composite material. In some such tools, the flexible sheet of composite material may be operatively positioned on a substrate, which additionally or alternatively may be described as a die 152. For example, the substrate, in some embodiments, may be a malleable substrate, such that the structures 158 deform the flexible sheet of composite material into the malleable substrate to define the predetermined, non-planar pattern of contours on the flexible sheet of composite material.

In some methods 50 and composite structures, the predetermined, non-planar pattern of contours 60 may be substantially oriented transverse to a substantial portion of fibers imbedded in the sheet of composite material. For example, the contours 60 may be oriented at approximately 45° or at approximately 90° to the fibers of the composite material.

Figure 17:
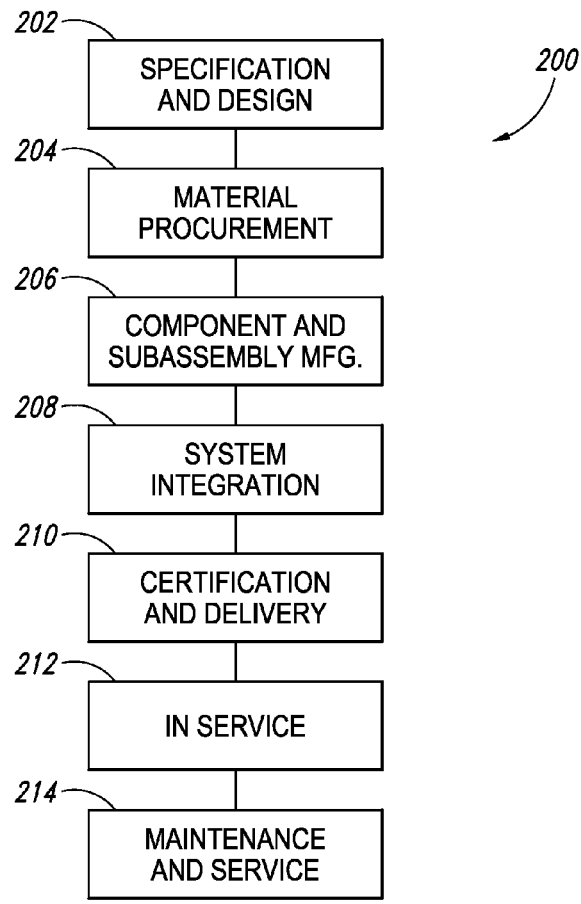
FIG. 17 is a flowchart representing aircraft production and service methodology.
Figure 18:
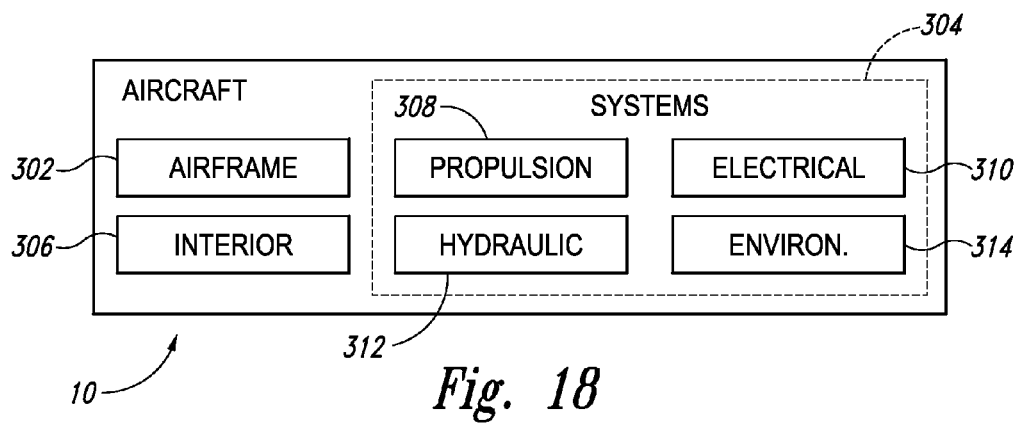
FIG. 18 is a schematic block diagram representing an aircraft.

Turning now to FIGS. 17-18, embodiments of the present disclosure may be described in the context of an aircraft manufacturing and service method 200 as shown in FIG. 17 and an aircraft 10 as shown in FIG. 18. During pre-production, exemplary method 200 may include specification and design 202 of the aircraft 10 and material procurement 204. During production, component and subassembly manufacturing 206 and system integration 208 of the aircraft 10 takes place. Thereafter, the aircraft 10 may go through certification and delivery 210 in order to be placed in service 212. While in service by a customer, the aircraft 10 is scheduled for routine maintenance and service 214 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 18, the aircraft 10 produced by exemplary method 200 may include an airframe 302 with a plurality of systems 304 and an interior 306. Examples of high-level systems 304 include one or more of a propulsion system 308, an electrical system 310, a hydraulic system 312, and an environmental system 314. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 206 may be fabricated or manufactured in a manner similar to components or subassemblies produced while the aircraft 10 is in service. Also, one or more apparatus embodiments, method embodiments, or a combination thereof may be utilized during the production stages 206 and 208, for example, by substantially expediting assembly of or reducing the cost of an aircraft 10. Similarly, one or more apparatus embodiments, method embodiments, or a combination thereof may be utilized while the aircraft 10 is in service, for example and without limitation, to maintenance and service 214.

Illustrative, non-exclusive examples of inventive subject matter according to the present disclosure are described in the following enumerated paragraphs:

A. A method of forming a composite structure, the method comprising:

defining a predetermined, non-planar pattern of contours in a flexible sheet of composite material;

conforming the flexible sheet of composite material to a layup mandrel; and curing the flexible sheet of composite material to form at least a portion of the composite structure.

A1. The method of paragraph A, wherein the defining includes setting the flexible sheet of composite material to at least temporarily retain the predetermined, non-planar pattern of contours in the flexible sheet, optionally wherein the setting includes at least partially curing and/or compacting the flexible sheet of composite material.

A2. The method of any of paragraphs A-A1, wherein the predetermined, non-planar pattern of contours includes a plurality of substantially parallel, and optionally parallel, ridges; optionally wherein the ridges are generally sinusoidal, and optionally sinusoidal, in profile.

A2.1. The method of paragraph A2, wherein the ridges have a depth of 0.1-5 mm, 0.1-2 mm, 0.1-1 mm, 0.1-0.5 mm, 0.5-5 mm, 0.5-2 mm, 0.5-1 mm, 1-5 mm, 1-2 mm, 2-5 mm, about 0.1 mm, about 0.5 mm, about 1 mm, about 2 mm, and/or about 5 mm.

A2.2. The method of any of paragraphs A2-A2.1, wherein the ridges have a peak to peak spacing of 1-20 mm, 1-15 mm, 1-10 mm, 1-5 mm, 5-20 mm, 5-15 mm, 5-10 mm, 10-20 mm, 10-15 mm, 15-20 mm, about 1 mm, about 5 mm, about 10 mm, about 15 mm, and/or about 20 mm.

A2.3. The method of any of paragraphs A2-A2.2, wherein the ridges are generally evenly spaced apart, and optionally evenly spaced apart.

A2.4. The method of any of paragraphs A2-A2.2, wherein the ridges vary in spacing.

A2.5. The method of any of paragraphs A2-A2.4, wherein the ridges are generally evenly deep, and optionally evenly deep.

A2.6. The method of any of paragraphs A2-A2.4, wherein the ridges vary in depth.

A3. The method of any of paragraphs A-A2.6, wherein the predetermined, non-planar pattern of contours includes a plurality of spaced-apart, discrete, localized contours.

A3.1. The method of paragraph A3, wherein the spaced-apart, discrete, localized contours have profiles that are circular, generally circular, rectangular, generally rectangular, ovular, generally ovular, diamond shaped, and/or generally diamond shaped.

A3.2. The method of any of paragraphs A3-A3.1, wherein the spaced-apart, discrete, localized contours are generally evenly spaced, and optionally evenly spaced, with respect to each other.

A3.3. The method of any of paragraphs A3-A3.1, wherein the spaced-apart, discrete, localized contours are unevenly spaced with respect to each other.

A3.4. The method of any of paragraphs A3-A3.3, wherein the spaced-apart, discrete, localized contours each have a depth of 0.1-5 mm, 0.1-2 mm, 0.1-1 mm, 0.1-0.5 mm, 0.5-5 mm, 0.5-2 mm, 0.5-1 mm, 1-5 mm, 1-2 mm, 2-5 mm, about 0.1 mm, about 0.5 mm, about 1 mm, about 2 mm, and/or about 5 mm.

A3.5. The method of any of paragraphs A3-A3.4, wherein the spaced-apart, discrete, localized contours are spaced apart by 1-20 mm, 1-15 mm, 1-10 mm, 1-5 mm, 5-20 mm, 5-15 mm, 5-10 mm, 10-20 mm, 10-15 mm, 15-20 mm, about 1 mm, about 5 mm, about 10 mm, about 15 mm, about 20 mm, and/or greater than 20 mm.

A4. The method of any of paragraphs A-A3.5, wherein the layup mandrel has a three-dimensional layup surface, the method further comprising:

positioning the flexible sheet of composite material on the three-dimensional layup surface.

A4.1. The method of paragraph A4, wherein the three-dimensional layup surface includes a complex contour.

A5. The method of any of paragraphs A-A4.1, wherein the conforming initially results in one or more undesirable wrinkles in the flexible sheet of composite material on the layup mandrel; and wherein the defining is performed following the conforming and includes eliminating the one or more undesirable wrinkles.

A5.1. The method of paragraph A5, wherein the eliminating includes distributing composite material from the one or more undesirable wrinkles amongst at least a portion of the predetermined, non-planar pattern of contours.

A6. The method of any of paragraphs A-A4.1, wherein the defining includes preventing formation of undesirable wrinkles in the sheet of composite material on the layup mandrel.

A7. The method of any of paragraphs A-A6, wherein the conforming includes distributing composite material from the predetermined, non-planar pattern of contours onto regions of the layup mandrel that tend to create one or more undesirable wrinkles without the defining.

A8. The method of any of paragraphs A-A7, wherein the defining is performed prior to the conforming.

A9. The method of any of paragraphs A-A8, wherein the defining is performed simultaneous with the conforming.

A10. The method of any of paragraphs A-A9, wherein the defining is performed following the conforming.

A11. The method of any of paragraphs A-A10, wherein the defining includes vacuum compacting the flexible sheet of composite material, optionally to the layup mandrel.

A12. The method of any of paragraphs A-A11, wherein the conforming includes vacuum compacting the flexible sheet of composite material on the layup mandrel.

A13. The method of any of paragraphs A-A12,
wherein the defining is performed by a vacuum compaction tool, and wherein the vacuum compaction tool includes:
  a body sized to at least partially span, and optionally fully span, the flexible sheet of composite material, wherein the body includes regions of relative stiffness and regions of relative compliance, and wherein the regions of relative stiffness and the regions of relative compliance collectively correspond to and are configured to define the predetermined, non-planar pattern of contours; and
  a vacuum distribution manifold in fluid communication with the regions of relative compliance and configured to selectively apply a vacuum to the regions of relative compliance; and
  wherein the defining includes:
  applying a vacuum to the regions of relative compliance;
  deforming the body of the vacuum compaction tool to correspond to the predetermined, non-planar pattern of contours;
  retaining the flexible sheet of composite material against the body of the vacuum compaction tool; and
  at least partially compacting the flexible sheet of composite material to at least temporarily retain the predetermined, non-planar pattern of contours in the flexible sheet of composite material.

A13.1 The method of paragraph A13, wherein the vacuum compaction tool further includes:
  a sealing structure configured to form a fluid seal between the body and the layup mandrel; and
  wherein the conforming further includes:
  applying a vacuum between the body of the vacuum compaction tool and the layup mandrel to compact the flexible sheet of composite material on the layup mandrel.

A14. The method of any of paragraphs A-A13.1, further comprising:
  prior to the defining, positioning a die sheet between the flexible sheet of composite material and a transfer chuck, wherein the die sheet includes a plurality of spaced-apart voids that correspond to the predetermined, non-planar pattern of contours;
  wherein the defining includes deforming, with the transfer chuck, the flexible sheet of composite material at least partially into the plurality of spaced-apart voids.

A14.1. The method of paragraph A14, wherein the transfer chuck includes a vacuum chuck, optionally the vacuum compaction tool described in paragraph A13.

A15. The method of any of paragraphs A-A14.1, wherein the defining includes:
  placing the flexible sheet of composite material on a die, wherein the die includes voids corresponding to the predetermined, non-planar pattern of contours; and
  deforming the flexible sheet of composite material at least partially into the voids.

A15.1. The method of paragraph A15, wherein the deforming the flexible sheet of composite material includes rolling a roller over the flexible sheet of composite material placed on the die.

A16. The method of any of paragraphs A-A15.1, wherein the defining includes:
  placing the flexible sheet of composite material on a substrate, optionally a malleable substrate; and
  rolling a roller over the flexible sheet of composite material, wherein the roller includes one or more contour imparting structures that are configured to impart the predetermined, non-planar pattern of contours on the flexible sheet of composite material.

A17. The method of any of paragraphs A-A16, further comprising:
  prior to the conforming, stacking two or more plies of the composite material, wherein the defining is performed on only a subset of the plies.

A17.1. The method of paragraph A17, wherein the conforming includes lateral slippage of adjacent plies.

A18. The method of any of paragraphs A-A17.1, wherein the flexible sheet of composite material is constructed of one or more pre-preg composite plies.

A19. The method of any of paragraphs A-A18, wherein the composite structure is an aerospace structure.

A20. The method of any of paragraphs A-A19, wherein the cured flexible sheet includes an aerospace structure, an airfoil structure, and/or a skin structure.

A21. The method of any of paragraphs A-A20,
wherein the flexible sheet of composite material includes a fiber reinforced composite material with a substantial portion of fibers oriented in a first direction; and
wherein the predetermined, non-planar pattern of contours are substantially oriented in a second direction.

A21.1 The method of paragraph A21, wherein the second direction is transverse to the first direction, optionally at (approximately) 45° or at (approximately) 90°.

A22. An aerospace structure including a composite structure formed according to the method of any of paragraphs A-A21.

B. An aerospace structure, comprising:
  a composite structure formed from a sheet of composite material, wherein the composite structure has a non-planar pattern of contours defined therein.

B1. The aerospace structure of paragraph B, wherein the non-planar pattern of contours includes a plurality of substantially parallel, and optionally parallel, ridges; optionally wherein the ridges are generally sinusoidal, and optionally sinusoidal, in profile.

B1.1. The aerospace structure of paragraph B1, wherein the ridges have a depth of 0.1-5, 0.1-2, 0.1-1, 0.1-0.5, 0.5-5, 0.5-2, 0.5-1, 1-5, 1-2, 2-5, about 0.1, about 0.5, about 1, about 2, and/or about 5 mm.

B1.2. The aerospace structure of any of paragraphs B1-B1.1, wherein the ridges have a peak to peak spacing of 1-20, 1-15, 1-10, 1-5, 5-20, 5-15, 5-10, 10-20, 10-15, 15-20, about 1, about 5, about 10, about 15, and/or about 20 mm.

B1.3. The aerospace structure of any of paragraphs B1-B1.2, wherein the ridges are generally evenly spaced apart, and optionally evenly spaced apart.

B1.4. The aerospace structure of any of paragraphs B1-B1.2, wherein the ridges vary in spacing.

B1.5. The aerospace structure of any of paragraphs B1-B1.4, wherein the ridges vary in depth.

B2. The aerospace structure of any of paragraphs B-B1.5, wherein the non-planar pattern of contours includes a plurality of spaced-apart, discrete, localized contours.

B2.1. The aerospace structure of paragraph B2, wherein the spaced-apart, discrete, localized contours have profiles that are circular, generally circular, rectangular, generally rectangular, ovular, generally ovular, diamond shaped, and/or generally diamond shaped.

B2.2. The aerospace structure of any of paragraphs B2-B2.1, wherein the spaced-apart, discrete, localized contours are generally evenly spaced, and optionally evenly spaced, with respect to each other.

B2.3. The aerospace structure of any of paragraphs B2-B2.1, wherein the spaced-apart, discrete, localized contours are unevenly spaced with respect to each other.

B2.4. The aerospace structure of any of paragraphs B2-B2.3, wherein the spaced-apart, discrete, localized contours each have a depth of 0.1-5, 0.1-2, 0.1-1, 0.1-0.5, 0.5-5, 0.5-2, 0.5-1, 1-5, 1-2, 2-5, about 0.1, about 0.5, about 1, about 2, and/or about 5 mm.

B2.5. The aerospace structure of any of paragraphs B2-B2.4, wherein the spaced-apart, discrete, localized contours are spaced apart by 1-20, 1-15, 1-10, 1-5, 5-20, 5-15, 5-10, 10-20, 10-15, 15-20, about 1, about 5, about 10, about 15, about 20 mm, and/or greater than 20 mm.

B3. The aerospace structure of any of paragraphs B-B2.5, wherein the sheet of composite material includes a fiber reinforced composite material with a substantial portion of fibers oriented in a first direction; and
wherein the non-planar pattern of contours are substantially oriented in a second direction.

B3.1. The method of paragraph B3, wherein the second direction is transverse to the first direction, optionally at (approximately) 45° or at (approximately) 90°.

B3. An aircraft, comprising:
a fuselage;
wings operatively coupled to the fuselage;
a vertical stabilizer operatively coupled to the fuselage; and
horizontal stabilizers operatively coupled to the fuselage;
wherein at least one of the fuselage, the wings, the vertical stabilizer, and the horizontal stabilizers includes the aerospace structure of any of paragraphs B-B2.5.

C. A vacuum chuck for vacuum compacting a flexible sheet of composite material to a layup mandrel, the layup mandrel defining a three-dimensional layup surface, the vacuum chuck comprising:
a body, wherein the body includes regions of relative stiffness and regions of relative compliance, wherein the body defines an engagement surface for operative engagement of the flexible sheet of composite material; and
a vacuum distribution manifold in fluid communication with the regions of relative compliance and configured to selectively apply a vacuum to the regions of relative compliance to deform the engagement surface from a first configuration to a second configuration that defines a predetermined, non-planar pattern of contours with the engagement surface.

C1. The vacuum chuck of paragraph C, further comprising:
a sealing structure configured to form a fluid seal between the body and the three-dimensional layup surface;
wherein the vacuum distribution manifold is further configured to selectively apply a vacuum between the body and the three-dimensional layup surface.

C2. The vacuum chuck of any of paragraphs C-C1, wherein the regions of relative stiffness are evenly spaced amongst the regions of relative compliance.

C3. The vacuum chuck of any of paragraphs C-C1, wherein the regions of relative stiffness are unevenly spaced amongst the regions of relative compliance.

C4. The vacuum chuck of any of paragraphs C-C3, wherein the predetermined, non-planar pattern of contours includes a plurality of substantially parallel, and optionally parallel, ridges corresponding to the regions of relative stiffness; optionally wherein the ridges are generally sinusoidal, and optionally sinusoidal, in profile.

C4.1. The vacuum chuck of paragraph C4, wherein the ridges have a depth of 0.1-5, 0.1-2, 0.1-1, 0.1-0.5, 0.5-5, 0.5-2, 0.5-1, 1-5, 1-2, 2-5, about 0.1, about 0.5, about 1, about 2, and/or about 5 mm.

C4.2. The vacuum chuck of any of paragraphs C4-C4.1, wherein the ridges have a peak to peak spacing of 1-20, 1-15, 1-10, 1-5, 5-20, 5-15, 5-10, 10-20, 10-15, 15-20, about 1, about 5, about 10, about 15, and/or about 20 mm.

C5. The vacuum chuck of any of paragraphs C-C4.2, in combination with the flexible sheet of composite material and the layup mandrel, wherein the flexible sheet of composite material is operatively positioned between the body of the vacuum chuck and the three-dimensional layup surface, and wherein the engagement surface is deformed to the second configuration.

C5.1. The vacuum chuck of paragraph C5,
wherein the three-dimensional layup surface defines a first region of relatively lesser radius of curvature and a second region of relatively greater radius of curvature; and
wherein the regions of relative compliance include a first subset of regions having a first width and a second subset of regions having a second width that is greater than the first width, wherein the first subset is positioned adjacent to the first region of the three-dimensional layup surface, and wherein the second subset is positioned adjacent to the second region of the three-dimensional layup surface.

D. A system for forming a composite structure having a predetermined, non-planar pattern of contours, the system comprising:
a die sheet, wherein the die sheet includes a plurality of spaced-apart voids corresponding to the predetermined, non-planar pattern of contours;
a transfer chuck, wherein the transfer chuck is configured to operatively engage the die sheet between the transfer chuck and a flexible sheet of composite material, and wherein the transfer chuck is further configured to operatively deform the flexible sheet of composite material at least partially into the plurality of spaced-apart voids of the die sheet; and
a layup mandrel with a layup surface for operative placement of the flexible sheet of composite material by the transfer chuck.

D1. The system of paragraph D, wherein the transfer chuck includes a vacuum compaction tool.

D2. The system of any of paragraphs D-D1, wherein the spaced-apart voids are evenly spaced across the die sheet.

D3. The system of any of paragraphs D-D2, wherein the spaced-apart voids are unevenly spaced across the die sheet.

D3.1. The system of paragraph D3,
wherein the layup surface defines a three-dimensional layup surface with a first region of relatively lesser radius of curvature and a second region of relatively greater radius of curvature; and wherein a first subset of the plurality of spaced-apart voids are spaced relatively closer together to correspond to the first region of relatively lesser radius of curvature, and wherein a second subset of the plurality of spaced-apart voids are spaced relatively further apart to correspond to the second region of relatively greater radius of curvature.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of forming a composite structure, the method comprising:
    defining a predetermined, non-planar pattern of contours in a flexible sheet of composite material;
    conforming the flexible sheet of composite material to a layup mandrel; and
    curing the flexible sheet of composite material to form at least a portion of the composite structure.

2. The method of claim 1, wherein the defining includes compacting the flexible sheet of composite material to at least temporarily retain the predetermined, non-planar pattern of contours in the flexible sheet.

3. The method of claim 1, wherein the predetermined, non-planar pattern of contours includes a plurality of substantially parallel ridges, and wherein the ridges have a depth of 0.1-5 mm.

4. The method of claim 3, wherein the ridges have a peak to peak spacing of 1-20 mm.

5. The method of claim 3, wherein the ridges are generally evenly spaced apart.

6. The method of claim 3, wherein the ridges vary in spacing.

7. The method of claim 3, wherein the ridges are generally evenly deep.

8. The method of claim 3, wherein the ridges vary in depth.

9. The method of claim 1, wherein the layup mandrel has a three-dimensional layup surface with a complex contour.

10. The method of claim 1,
    wherein the conforming initially results in one or more undesirable wrinkles in the flexible sheet of composite material on the layup mandrel; and
    wherein the defining is performed following the conforming and includes eliminating the one or more undesirable wrinkles.

11. The method of claim 10, wherein the eliminating includes distributing composite material from the one or more undesirable wrinkles amongst at least a portion of the predetermined, non-planar pattern of contours.

12. The method of claim 1, wherein the defining includes preventing formation of undesirable wrinkles in the flexible sheet of composite material on the layup mandrel.

13. The method of claim 1, wherein the conforming includes distributing composite material from the predetermined, non-planar pattern of contours onto regions of the layup mandrel that tend to create one or more undesirable wrinkles without the defining.

14. The method of claim 1, wherein the defining includes vacuum compacting the flexible sheet of composite material.

15. The method of claim 1, wherein the conforming includes vacuum compacting the flexible sheet of composite material on the layup mandrel.

16. The method of claim 1,
    wherein the defining is performed by a vacuum compaction tool, and wherein the vacuum compaction tool includes:
        a body sized to at least partially span, and optionally fully span, the flexible sheet of composite material, wherein the body includes regions of relative stiffness and regions of relative compliance, and wherein the regions of relative stiffness and the regions of relative compliance collectively correspond to and are configured to define the predetermined, non-planar pattern of contours; and
        a vacuum distribution manifold in fluid communication with the regions of relative compliance and configured to selectively apply a vacuum to the regions of relative compliance; and
    wherein the defining includes:
        applying a vacuum to the regions of relative compliance;
        deforming the body of the vacuum compaction tool to correspond to the predetermined, non-planar pattern of contours;
        retaining the flexible sheet of composite material against the body of the vacuum compaction tool; and
        at least partially compacting the flexible sheet of composite material to at least temporarily retain the predetermined, non-planar pattern of contours in the flexible sheet of composite material.

17. The method of claim 16, wherein the vacuum compaction tool further includes:

a sealing structure configured to form a fluid seal between the body and the layup mandrel; and wherein the conforming further includes:

applying a vacuum between the body of the vacuum compaction tool and the layup mandrel to compact the flexible sheet of composite material on the layup mandrel.

18. A method of forming a composite structure, the method comprising:

defining a predetermined, non-planar pattern of contours in a flexible sheet of composite material, wherein the predetermined, non-planar pattern of contours includes a plurality of spaced-apart, discrete, localized contours, and wherein the spaced-apart, discrete, localized contours each have a depth of 0.1-5 mm;

conforming the flexible sheet of composite material to a layup mandrel; and curing the flexible sheet of composite material to form at least a portion of the composite structure.

19. The method of claim 18, wherein the spaced-apart, discrete, localized contours are spaced apart by 1-20 mm.

20. The method of claim 18, further comprising:

prior to the defining, positioning a die sheet between the flexible sheet of composite material and a transfer chuck, wherein the die sheet includes a plurality of spaced-apart voids that correspond to the predetermined, non-planar pattern of contours;

wherein the defining includes deforming, with the transfer chuck, the flexible sheet of composite material at least partially into the plurality of spaced-apart voids.

21. The method of claim 18, wherein the defining includes:

placing the flexible sheet of composite material on a die, wherein the die includes voids corresponding to the plurality of spaced-apart discrete, localized contours; and deforming the flexible sheet of composite material at least partially into the voids, wherein the deforming the flexible sheet of composite material includes rolling a roller over the flexible sheet of composite material placed on the die.

22. A system for forming a composite structure having a predetermined, non-planar pattern of contours, the system comprising:

a die sheet, wherein the die sheet includes a plurality of spaced-apart voids corresponding to the predetermined, non-planar pattern of contours;

a transfer chuck, wherein the transfer chuck is configured to operatively engage the die sheet between the transfer chuck and a flexible sheet of composite material, and wherein the transfer chuck is further configured to operatively deform the flexible sheet of composite material at least partially into the plurality of spaced-apart voids of the die sheet; and a layup mandrel with a layup surface for operative placement of the flexible sheet of composite material by the transfer chuck.

23. The system of claim 22, wherein the transfer chuck includes a vacuum compaction tool.

24. The system of claim 22, wherein the layup surface defines a three-dimensional layup surface with a first region of relatively lesser radius of curvature and a second region of relatively greater radius of curvature; and wherein a first subset of the plurality of spaced-apart voids are spaced relatively closer together to correspond to the first region of relatively lesser radius of curvature, and wherein a second subset of the plurality of spaced-apart voids are spaced relatively further apart to correspond to the second region of relatively greater radius of curvature.

* * * * *